United States Patent [19]
Gjerde

[11] Patent Number: 5,553,780
[45] Date of Patent: Sep. 10, 1996

[54] SPRAYING SYSTEM WITH LOW LIQUID LEVEL WARNING

[75] Inventor: Harlan T. Gjerde, Minneapolis, Minn.

[73] Assignee: The Toro Company, Minneapolis, Minn.

[21] Appl. No.: 384,260

[22] Filed: Feb. 3, 1995

[51] Int. Cl.⁶ ................................................ G01F 23/00
[52] U.S. Cl. ........................ 239/71; 222/23; 137/558; 116/109
[58] Field of Search .................. 239/71–74; 137/558; 222/23, 39; 116/227, 109

[56] References Cited

U.S. PATENT DOCUMENTS

| | | | |
|---|---|---|---|
| 1,086,663 | 2/1914 | Gould et al. | 137/577 |
| 1,280,855 | 10/1918 | Rowland et al. | 222/23 |
| 1,521,817 | 1/1925 | Jerdone | 137/590 |
| 1,523,320 | 1/1925 | Wall | 137/590 |
| 2,601,894 | 7/1952 | Morse | 137/582 |
| 2,734,561 | 2/1956 | Funkhouser | 137/398 |
| 2,792,258 | 5/1957 | Huber | 239/71 |
| 2,810,606 | 10/1957 | Taylor | 239/71 |
| 3,326,264 | 6/1967 | Howard | 137/398 |
| 4,250,921 | 2/1981 | Pingel et al. | 137/625.41 |
| 4,593,855 | 6/1986 | Forsyth | 239/74 |
| 4,890,644 | 1/1990 | Hoeptner, III et al. | 137/625.41 |
| 4,957,138 | 9/1990 | Pingel et al. | 137/549 |
| 5,176,174 | 1/1993 | Toraason et al. | 137/590 |

FOREIGN PATENT DOCUMENTS

| | | | |
|---|---|---|---|
| 3407242 | 1/1956 | Germany | 222/23 |
| 2447285 | 4/1976 | Germany | 239/71 |

Primary Examiner—Lesley D. Morris
Attorney, Agent, or Firm—James W. Miller

[57] ABSTRACT

A spraying system for providing a pressurized liquid spray for cleaning purposes is mounted on a vehicle for use outdoors. The system includes a liquid storage tank, a spray device for directing a spray of liquid therefrom, and a liquid supply system for pumping liquid from the liquid storage tank and for providing such liquid under pressure to the spray device. A standpipe is located within the liquid storage tank, connected to the tank liquid outlet, having a liquid inlet spaced above the level of the tank liquid outlet by a short distance. As the liquid is drawn from the tank and eventually reaches the level of the standpipe liquid inlet, air will be entrained with the liquid as the liquid then continues to enter the standpipe, causing the spray to sputter or spit as it exits the spray device. This alerts the operator to a low level of liquid in the tank and comprises a warning that use of the spraying system should be discontinued until the liquid storage tank is refilled with liquid. The standpipe includes a bleed hole, spaced between the standpipe liquid inlet and the tank liquid outlet, for allowing some liquid to still flow to the pump assembly even if the liquid level drops below the standpipe liquid inlet.

15 Claims, 2 Drawing Sheets

SPRAYING SYSTEM WITH LOW LIQUID LEVEL WARNING

TECHNICAL FIELD

This invention relates to a spraying system for providing a high pressure liquid spray for cleaning purposes, and, in particular, to such a spraying system which conveniently warns or alerts the operator when the level of the liquid in a liquid storage tank is low.

BACKGROUND OF THE INVENTION

Spraying systems are known for creating a high pressure liquid spray and for directing such spray on surfaces or items to be cleaned or treated. Such systems often include a liquid storage tank for holding a supply of the liquid to be sprayed, a pump assembly for pumping the liquid from the liquid storage tank and for increasing the pressure of the liquid to a level which causes the liquid to form a spray, and a spray device connected to the pump assembly for directing the spray in a desired direction. As the liquid storage tank holds a finite supply of the liquid, the level of the liquid in the liquid storage tank will recede during a spraying operation. It is important that the liquid not be completely drained from the liquid storage tank or damage to the pump assembly may result.

Various indicators or alarms can be installed in the spraying system to inform the operator of the level of the liquid in the liquid storage tank or to alert the operator when the liquid level in the liquid storage tank reaches a predetermined low level. For example, liquid storage tanks are often provided with sight gages or transparent windows that allow the liquid level within the liquid storage tank to be visually observed. In addition, it would be possible to have a float activated alarm within the liquid storage tank that would sound an audible bell or illuminate a visible warning light when the liquid level within the liquid storage tank reaches a particular level. Such systems allow the operator to stop the spraying operation before the liquid in the liquid storage tank is completely exhausted.

However, in certain spraying systems, particularly those intended for use outdoors and which may be carried or mounted on a work or utility vehicle, the spray device is usually connected to the pump assembly by an extremely long conduit or hose. When using such a system, it is not unusual for the operator to be located many feet away from the liquid storage tank and pump assembly, both of which remain mounted on the vehicle, when the hose connected to the spray device is at its maximum extension. Thus, the user is not able to see or monitor any sight gages which might be provided on the liquid storage tank, and may not be able to see or hear any alarms or warnings that occur either at the liquid storage tank or the pump assembly. Accordingly, it is still possible for the operator not to know that the liquid level in the liquid storage tank has reached a critically low level when the operator is using the spray device.

Moreover, the known liquid level indicators or alarms described are all relatively complex and add extra cost and expense to the spraying system. For example, liquid storage tanks can be inexpensively molded in one-piece from plastic, but it becomes much more expensive to mold such liquid storage tanks with transparent windows or provide them with external sight gages. Alarms that illuminate lights or sound bells require numerous additional components: a float or other device for sensing the liquid level in the liquid storage tank, an electrical switch which is closed when the float reaches the predetermined low level, a circuit for connecting the switch to a source of electrical energy and to the light or bell, and the light or bell itself. In addition, such alarms require some form of electrical energy for proper operation, and are not extremely reliable, particularly on equipment used outdoors where the components of the alarm are exposed to the weather.

SUMMARY OF THIS INVENTION

One aspect of this invention is to provide a spraying system having a low liquid level warning that solves some of the problems with the conventional liquid level indicators or alarms described above. For example, the low liquid level warning of this invention is provided to the operator at the location of the spray device, to be easily discernible by the operator even when the operator may be remotely located from the liquid storage tank and/or the pump assembly. In addition, the low liquid level warning of this invention comprises a passive, non-powered portion of the liquid supply system through which liquid passes out of the liquid storage tank on its way to the spray device.

Accordingly, one aspect of this invention comprises a spraying system for spraying a liquid under pressure. The system comprises a liquid storage tank. A spray device is provided which may be manipulated by the operator to allow the operator to direct a spray of the liquid in desired directions. A liquid delivery means connects the spray device to the liquid storage tank for supplying liquid under pressure to the spray device from the liquid storage tank. A low liquid level warning means is also provided for causing an indication, at the location of the spray device, that the level of the liquid in the liquid storage tank has reached a low level, whereby the operator is alerted to discontinue using the spray device and to refill the liquid storage tank with liquid even when the operator and the spray device are located remotely from the liquid storage tank.

BRIEF DESCRIPTION OF THE DRAWINGS

This invention will be described more completely in the following Detailed Description, when taken in conjunction with the following drawings, in which like referenced numerals refer to like elements throughout.

DETAILED DESCRIPTION

This invention comprises a spraying system 2 for providing a high pressure liquid spray for cleaning or washing purposes. The liquid to be sprayed is typically water or a combination of water and various additives. In particular, this invention comprises such a spraying system 2 which is mounted on a work or utility vehicle 4 to allow spraying system 2 to be conveniently transported from one location to another.

Figure 1:
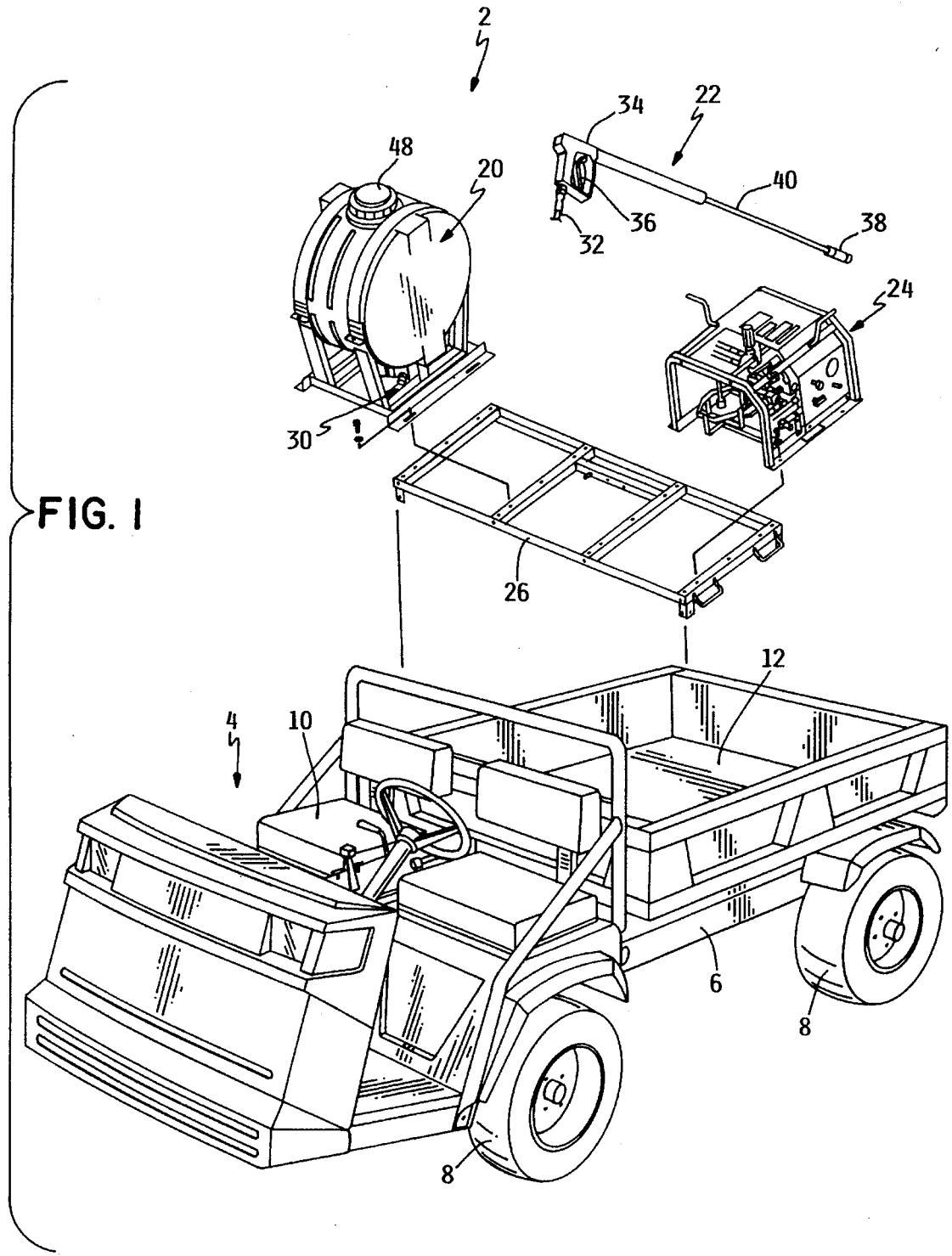
FIG. 1 is a perspective view of a typical vehicle on which the spraying system of this invention may be carried, particularly illustrating the components of the spraying system in an exploded form for the sake of clarity.

One vehicle 4 on which spraying system 2 may be mounted is illustrated in FIG. 1. Vehicle 4 includes a frame 6 supported by ground engaging wheels 8, an operator's compartment 10 at the front for holding an operator and at least one passenger, and a load carrying area 12 to the rear of operator's compartment 10 in which equipment may be mounted or loads may be carried. An internal combustion engine (not shown) is provided for driving at least some of wheels 8 to propel vehicle 4. This engine includes suitable power takeoff means (also not shown) for powering accessory equipment, such as spraying system 2, that may be mounted on vehicle 4.

Vehicle 4 as shown in FIG. 1 is from the Workman line of vehicles which is manufactured and sold by The Toro Company, Minneapolis, Minn. However, spraying system 2 is not limited for use with this specific vehicle, or even for use on a vehicle.

Spraying system 2 includes a number of interconnected components comprising a liquid storage tank 20 for holding a supply of the liquid to be sprayed, a spray device 22 for spraying such liquid in a desired direction in a spray or stream therefrom, and a liquid supply system for supplying liquid to spray device 22 at a pressure sufficiently high such that the liquid forms a spray or stream as the liquid exits spray device 22. The liquid supply system includes a pump assembly 24 operatively connected between liquid storage tank 20 and spray device 22. For ease of convenience in mounting these components on vehicle 4, a mounting platform 26 is provided that may be secured to a portion of vehicle 4 in back of operator's compartment 10. Both liquid storage tank 20 and pump assembly 24 are fixed or secured to mounting platform 26 using any suitable means.

When spraying system 2 is mounted on a vehicle 4 as shown in FIG. 1, pump assembly 24 is coupled to the power takeoff means of the engine to allow pump assembly 24 to be driven from the vehicle's own engine. A clutch (not shown) or other selectively operable control device is provided for allowing pump assembly 24 to be selectively driven, i.e. it is not continuously driven whenever the engine of vehicle 4 is in operation but only when desired by the operator. However, if desired, spraying system 2 could include its own separate engine or motor that would be started whenever spraying system 2 is to be operated, rather than using the engine of vehicle 4. If spraying system 2 is not mounted on vehicle 4, but in some fixed location, e.g. on top of a fixed mounting platform that is stationary relative to the ground, then it may be necessary for system 2 to have its own power source. It is not important whether or not spraying system 2 of this invention has its own power source or not.

Liquid storage tank 20 of spraying system 2 has a liquid outlet 30 in the bottom thereof adjacent the lowest level of liquid storage tank 20 to allow the liquid to exit from liquid storage tank 20. Pump assembly 24 has an inlet which is connected to liquid storage tank outlet 30 by a conduit or hose. This conduit or hose is not shown in FIG. 1 for the purpose of clarity. In addition, pump assembly 24 has an outlet which supplies liquid under pressure to spray device 22. A further conduit or hose 32, a portion of which is shown in FIG. 1, is provided for connecting the pump assembly outlet to the inlet of spray device 22. All such liquid carrying conduits or hoses also form a portion of the liquid supply system that carries the liquid from liquid storage tank 20 to spray device 22 through pump assembly 24.

Preferably, spray device 22 comprises a hand-held member having a grip portion 34 to allow spray device 22 to be held and pointed by a operator to direct a spray of liquid therefrom. Grip portion 34 includes a trigger 36 that may be depressed by the operator as he is holding spray device 22 to initiate the flow of liquid therethrough. Spray device 22 includes a nozzle 38, through which the spray exits, located at the extreme end of a lance or wand portion 40 that is attached to grip portion 34. Thus, the operator may swing spray device 22 back and forth while keeping trigger 36 depressed to use spray device 22 to clean or wash items or surfaces using the spray that exits from nozzle 38.

In order to facilitate usage of spraying system 2, hose 32 that connects spray device 22 to pump assembly 24 is quite long. For example, hose 32 may be well in excess of ten feet, and is preferably in the range of from twenty to one hundred feet. Thus, after placing spraying system 2 in operation by coupling pump assembly 24 to whatever power source is used to provide power, a supply of high pressure liquid is available, through hose 32, to spray device 22. This liquid is sprayed from spray device 22 by the operator simply by depressing trigger 36.

It will not be uncommon for the operator to be located quite some distance away from spraying system 2 when holding spray device 22 due to the length of hose 32 that connects spray device 22 to pump assembly 24. When hose 32 is extended towards its maximum extension, the operator will be far enough away from pump assembly 24 so that it will be difficult, if not impossible, to see or hear any low liquid level warnings from a visual or audible alarm that might be provided at liquid storage tank 20 or pump assembly 24. This is particularly true considering the noise generated by the power source for pump assembly 24 and because the operator's attention is usually focused, and rightfully so, on the operation of spray device 22 to ensure that the liquid spray is being properly directed. Thus, it is quite possible for the operator to miss a low liquid level warning which is provided at the location of either liquid storage tank 20 or pump assembly 24.

If the operator misses such a warning and continues to operate spray device 22, unaware that the liquid is about to be exhausted from liquid storage tank 20, pump assembly 24 will be quickly damaged if the liquid in liquid storage tank 20 is exhausted during a spraying operation. If spray device 22 is not being operated, pump assembly 24 enters into a recirculation mode in which some liquid is drawn from liquid storage tank 20, passes through pump assembly 24 for lubrication purposes, and then is returned to liquid storage tank 20. However, during an actual spraying operation in which trigger 36 of spray device 22 remains depressed, this recirculation mode is overridden and the liquid continuously passes from liquid storage tank 20, through pump assembly 24, and then out through spray device 22. If this liquid stream runs dry during a spraying operation, the flow of liquid through pump assembly 24 ceases, the lubrication provided thereby thus ceases, and pump assembly 24 will be damaged in short order.

Spraying system 2 of this invention has a means 41 for providing to the operator, at the location of spray device 22, an indication or warning that the level of the liquid in liquid storage tank 20 has reached a low level. Thus, the operator is alerted to stop using spray device 22 by releasing trigger 36, thus allowing pump assembly 24 to enter into its recirculation mode. This warning will be directly provided to the operator whenever he or she is operating spray device 22 and even when the operator is located many feet away from liquid storage tank 20 or pump assembly 24. Thus, the operator need not be near liquid storage tank 20 or pump assembly 24 to receive the warning. This is an advantage over prior art warning or alarm systems.

Warning means 41 of this invention is further preferably provided by a passive, non-powered portion of the liquid supply system for supplying liquid from liquid storage tank 20 to spray device 22. Accordingly, warning means 41 of this invention is simple, durable, and does not require or consume any power to operate. Moreover, it is practically foolproof in operation and thus extremely reliable.

Warning means 41 of this invention is formed by a standpipe 42 in the lower portion of liquid storage tank 20 which standpipe 42 extends upwardly from the tank liquid outlet 30 to have a liquid inlet 44 located a short distance above tank liquid outlet 30. Liquid inlet 44 to standpipe 42 can simply comprise an open upper end 46 of standpipe 42. However, upper end 46 of standpipe 42 could be closed in some fashion, e.g. by a horizontal plate, and liquid inlet 44 to standpipe 42 could comprise one or more openings spaced around the circumference of standpipe 42 beneath its upper end.

Figure 2:
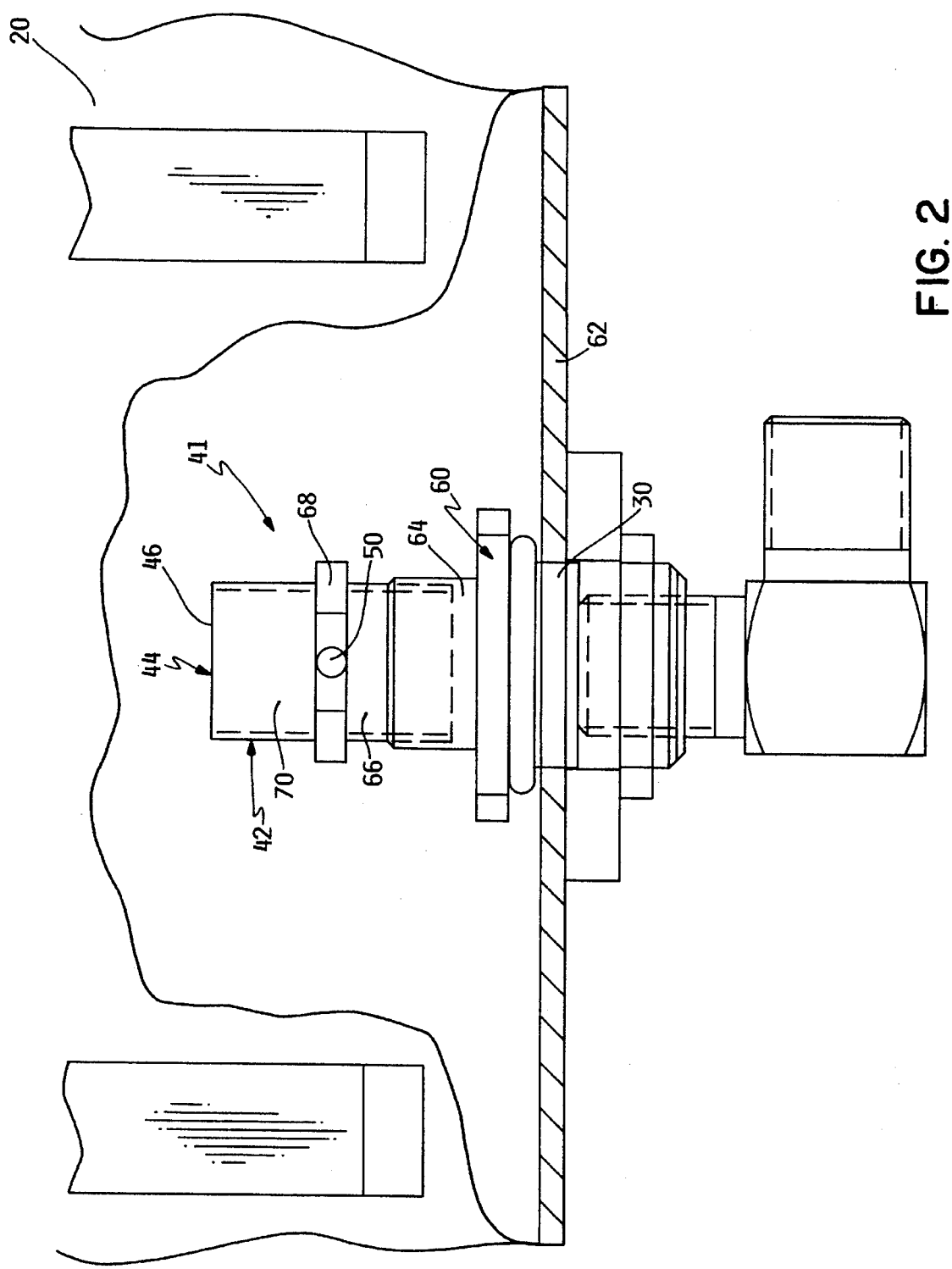
FIG. 2 is a side elevational view of a portion of the liquid storage tank of the spraying system shown in FIG. 1, with a portion of the liquid storage tank being broken away to illustrate the standpipe that forms the means for causing or creating the low liquid level warning at the location of the spray device.

In either event, liquid inlet 44 in standpipe 42 determines the level of liquid in liquid storage tank 20 at which the low liquid level warning will be given. When the liquid is above liquid inlet 44, no warning will be given. But, when the liquid reaches the level of liquid inlet 44 in standpipe 42 (as shown in FIG. 2), standpipe 42 will automatically generate a low liquid level warning that manifests itself at spray device 22.

As the liquid in liquid storage tank 20 reaches the level of liquid inlet 44, in this case as the liquid drops to the rim of open upper end 46 of standpipe 42, air in the upper portion of liquid storage tank 20 will become entrained or mixed with the liquid, particularly since the liquid will swirl around standpipe 42 as it reaches the level of the open upper end 46 and passes therethrough. It has been found by the Applicant that the amount of air entrained is sufficient to cause the liquid spray exiting from spray device 22 to become discontinuous, i.e. to sputter or spit. The sputtering of the spray forms a discernible alarm or warning to the operator, at the location of spray device 22, that the liquid in liquid storage tank 20 has reached the low liquid level determined by the elevation of liquid inlet 44 in standpipe 42 above the level of tank liquid outlet 30. Thus, upon noticing the sputtering of the spray, the operator can release trigger 36, causing pump assembly 24 to enter into its recirculation mode. The operator can then fill liquid storage tank 20 with additional liquid, after first removing a liquid storage tank cap 48 to open liquid storage tank 20. Spraying can then resume in a normal manner after liquid storage tank 20 is refilled.

It may not be possible or desirable for the operator to immediately stop the operation of spray device 22 upon first noticing the sputtering of the spray. For example, the operator may be in the midst of a cleaning operation that is about finished when the spray begins to sputter at spray device 22. The operator probably does not want to discontinue that cleaning operation, to drive vehicle 4 to some source of liquid for liquid storage tank 20, to refill liquid storage tank 20, and to then drive all the way back to finish the discontinued cleaning operation. It is more efficient to try and finish the cleaning operation all at once.

Accordingly, a bleed hole 50 is located in standpipe 42 some distance below the level of liquid inlet 44 to standpipe 42, but above tank liquid outlet 30. This bleed hole 50 will continue to receive liquid from liquid storage tank 20 even if the level of the liquid in liquid storage tank 20 passes beneath the level of liquid inlet 44, thus allowing liquid to continue to be passed on to pump assembly 24, albeit at a slower rate (the open area of bleed hole 50 is substantially less than the open area of liquid inlet 44 to standpipe 42). Accordingly, enough liquid is still passed to pump assembly 24 to prevent damage thereto, and to allow a spray of lessened volume to exit from spray device 22. Obviously, the operator should discontinue the operation of spray device 22 before the liquid level within tank 20 passes beneath bleed hole 50, or pump assembly damage will occur. But, bleed hole 50 provides a safety margin of a few minutes of additional spray device operation in the event the operator wishes to use spray device 22 for a short additional time or at first neglects or does not notice the sputtering that is occurring at spray device 22.

Various types of standpipes 42 could be provided in liquid storage tank 20. For example, a straight, vertically extending standpipe 42 could be provided having its lower end integrally affixed to tank liquid outlet 30. Or, standpipe 42 could be L-shaped to be affixed to a tank liquid outlet 30 provided in the side of liquid storage tank 30.

One preferred form of standpipe 42 is shown in FIG. 2 hereof. In this embodiment, a fitting 60 is secured or molded into lower wall 62 of liquid storage tank 20 which fitting forms tank liquid outlet 30. This fitting 62 includes a cylindrical, internally threaded socket 64 extending upwardly in the interior of tank 20 a short distance above lower wall 62 of liquid storage tank 20. Standpipe 42 comprises a straight, cylindrical length of pipe having a cylindrical, externally threaded lower section 66, a hex or wrench gripping portion 68 located in the middle thereof, and a cylindrical, externally threaded upper section 70 terminating in the open upper end 46 thereof. Standpipe 42 is simply screwed into place with lower section 66 thereof being received in socket 64 of fitting 60. A wrench or other tool can be received around hex portion 68 to tighten standpipe 42 in place.

When standpipe 42 is tightened into fitting 60 and is fully received therein, the hex portion 68 thereof and the cylindrical upper section 70 of standpipe 42 will be exposed to the liquid in liquid storage tank 20 above the level of socket 64. Bleed hole 50 can be drilled through standpipe 42 in any portion of this exposed length of standpipe 42. For example, bleed hole 50 can be most easily drilled in one of the flats on hex portion 68 of standpipe 42.

Various modifications of this invention will be apparent to those skilled in the art. For example, standpipe 42 has symmetrically shaped upper and lower sections 66 and 70, both of which are externally threaded, to allow either section 66 or 70 to be received in socket 64 and screwed therein. However, only one such section necessarily has to be threaded to allow standpipe 42 to be screwed into fitting 60. Accordingly, this invention is to be limited only by the appended claims.

I claim:

1. A spraying system for spraying a liquid under pressure, which comprises:

a liquid storage tank;

a spray device which may be selectively manipulated by an operator to allow the operator to direct a spray of the liquid in desired directions;

liquid delivery means connecting the spray device to the liquid storage tank for supplying liquid under pressure to the spray device from the liquid storage tank; and means for causing a warning, at the location of the spray device, that a level of the liquid in the liquid storage tank has reached a low level, whereby the operator is alerted to discontinue using the spray device and to refill the liquid storage tank with liquid even when the operator and the spray device are located remotely from the liquid storage tank.

2. A spraying system as in claim 1, wherein the spray device is hand-held having a grip portion to allow the spray device to be held and pointed by a operator to direct a spray of liquid therefrom.

3. A spraying system as in claim 1, wherein the liquid delivery means includes at least one elongated liquid supply conduit through which the liquid flows to the spray device such that the spray device may be located remotely from the liquid storage tank up to a maximum predetermined length of the liquid supply conduit.

4. A spraying system as in claim 1, wherein the low liquid level warning causing means is located within the liquid storage tank.

5. A spraying system as in claim 4, wherein the low liquid level warning causing means comprises a passive element in the liquid storage tank.

6. A spraying system as in claim 4, wherein the low liquid level warning causing means comprises a standpipe located within the liquid storage tank.

7. A spraying system as in claim 6, wherein the standpipe is operatively connected to a tank liquid outlet in the liquid storage tank and has a liquid inlet which is spaced above the level of the tank liquid outlet.

8. A spraying system as in claim 7, wherein the standpipe liquid inlet comprises an open upper end of the standpipe.

9. A spraying system as in claim 7, wherein the standpipe further comprises at least one bleed hole located between the standpipe liquid inlet and the tank liquid outlet, wherein the bleed hole allows continued flow of liquid through the standpipe even when the liquid level in the liquid storage tank drops below the standpipe liquid inlet.

10. A spraying system for spraying a liquid under pressure, which comprises:

a liquid storage tank;

a spray device which may be selectively manipulated by an operator to allow the operator to direct a spray of the liquid in desired directions;

liquid delivery means connecting the spray device to the liquid storage tank for supplying liquid under pressure to the spray device from the liquid storage tank; and means for causing a warning that a level of the liquid in the liquid storage tank has reached a low level, whereby the operator is alerted to discontinue using the spray device and to refill the liquid storage tank with liquid, wherein the low liquid level warning causing means comprises means for causing a discontinuity in the nature of the liquid flowing through the spray device when the level of the liquid in the liquid storage tank reaches the low level.

11. A spraying system as in claim 10, wherein the low liquid level warning causing means is located within the liquid storage tank.

12. A spraying system as in claim 10, wherein the low liquid level warning causing means comprises a passive element in the liquid storage tank.

13. A spraying system as in claim 10, wherein the low liquid level warning causing means comprises a standpipe located within the liquid storage tank.

14. A spraying system for spraying a liquid under pressure, which comprises:

a liquid storage tank;

a spray device which may be selectively manipulated by an operator to allow the operator to direct a spray of the liquid in desired directions;

liquid delivery means connecting the spray device to the liquid storage tank for supplying liquid under pressure to the spray device from the liquid storage tank; and means for causing a warning that a level of the liquid in the liquid storage tank has reached a low level, whereby the operator is alerted to discontinue using the spray device and to refill the liquid storage tank with liquid, wherein the low liquid level warning causing means comprises a passive element in the liquid supply means.

15. A spraying system as in claim 14, wherein the low liquid level warning causing means comprises a standpipe located within the liquid storage tank.

* * * * *